United States Patent [19]
Gosdowski et al.

[11] Patent Number: 4,922,143
[45] Date of Patent: May 1, 1990

[54] LINEAR UNIT

[75] Inventors: Gerhard Gosdowski, Bietigheim-Bissingen; Andreas Kettner, Stuttgart, both of Fed. Rep. of Germany

[73] Assignee: Robert Bosch GmbH, Stuttgart, Fed. Rep. of Germany

[21] Appl. No.: 155,718
[22] PCT Filed: May 6, 1987
[86] PCT No.: PCT/DE87/00201
  § 371 Date: Jan. 13, 1988
  § 102(e) Date: Jan. 13, 1988
[87] PCT Pub. No.: WO87/07453
  PCT Pub. Date: Dec. 3, 1987

[30] Foreign Application Priority Data

May 30, 1986 [JP] Japan ................... 3618194

[51] Int. Cl.$^5$ ............................ H02K 41/03
[52] U.S. Cl. ................................ 310/12
[58] Field of Search ................. 310/12, 13, 14

[56] References Cited

U.S. PATENT DOCUMENTS 3,934,183 1/1976 Saufferer ............... 310/12
4,286,180 8/1988 Langley ................ 310/12

FOREIGN PATENT DOCUMENTS 2458494 1/1981 France .
55-66267 5/1980 Japan .
0127555 7/1983 Japan ..................... 310/12
493140 8/1970 Switzerland ............. 310/12

Primary Examiner—Patrick R. Salce
Assistant Examiner—Judson H. Jones
Attorney, Agent, or Firm—Michael J. Striker

[57] ABSTRACT

A linear unit comprises carriage which is arranged longitudinally displaceably in a holder and is driven by a linear motor, the rotor of which is designed as a flexible strip with a tooth structure consisting of magnetic metal. The strip is fixed self-supportingly on the carriage at its two ends and is guided on both sides on the surfaces of the stators of the linear motor bounding the pole gap.

6 Claims, 1 Drawing Sheet

LINEAR UNIT

BACKGROUND OF THE INVENTION

The invention relates to a linear unit which can be used, for example, as handling equipment of industrial production, to seize an object in order to move the latter in one or more predetermined directions by certain amounts, entered in advance. For the drive of the carriage serving as a tool support, preferably electromagnetically operated linear motors are used which, with simple design, ensure a precise positioning of the carriage. Such drives with a gear rack of magnetically conducted material as motor rotor and magnetizable motor stator are known in large number. A construction described in German Offenlegungsschrift 2,247,509 uses as a gear rack a flexible strip of magnetic material, which has rectangular openings, which are arranged on the entire length perpendicular to the direction of movement, and which strip is fixed in its entire length to a solid magnetic bar, the thickness of which is sufficient for closing the magnetic flux and for transference of its movement to an outside element. In the case of a specific embodiment, two strips of magnetic material are provided, which are attached on two opposite sides of a bar of rectangular cross-section guided on roller or ball bearings. Each strip is assigned a stator, which has several pole masses, which are provided with windings and at the same time each have a toothing. The mutually facing surfaces of the tooth structures formed in the strips and the pole masses lie in two parallel planes with an intermediate space, which forms the pole gap.

SUMMARY OF THE INVENTION

It is an object of this invention to provide an improved linear unit for moving objects.

The linear unit according to the invention has, in comparison, the advantage that a separate, intrinsically rigid support, requiring a precision bearing, for the strip having the tooth structure is not necessary. The stators of the linear motor on the surfaces of which, limiting the pole gap, the strip is guided with friction contacts, do not require an exact alignment with respect to the carriage to be driven, since the strip is flexible in one direction, namely transversely to the pole gap. Alignment errors are thereby compensated by the strip sections located outside the stators in the direction of displacement, without the pole gap itself experiencing any change.

Advantageous further developments and improvements of the linear unit according to the invention are also possible. A preferred embodiment consists in that the strip consisting of metal is provided with rectangular openings which predetermine the tooth structure and are arranged on the entire length perpendicular to the direction of movement of the strip, and that the guide surfaces of the strip and/or the stators are provided with a non-magnetic liner, preferably a liner of plastics. This produces an easy-action slide pairing of the components with very narrow pole gap and thus maximum motor output. The application of special liners becomes superfluous if the strip is made of a plastic and includes a tooth structure of magnetic metal. The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 1:
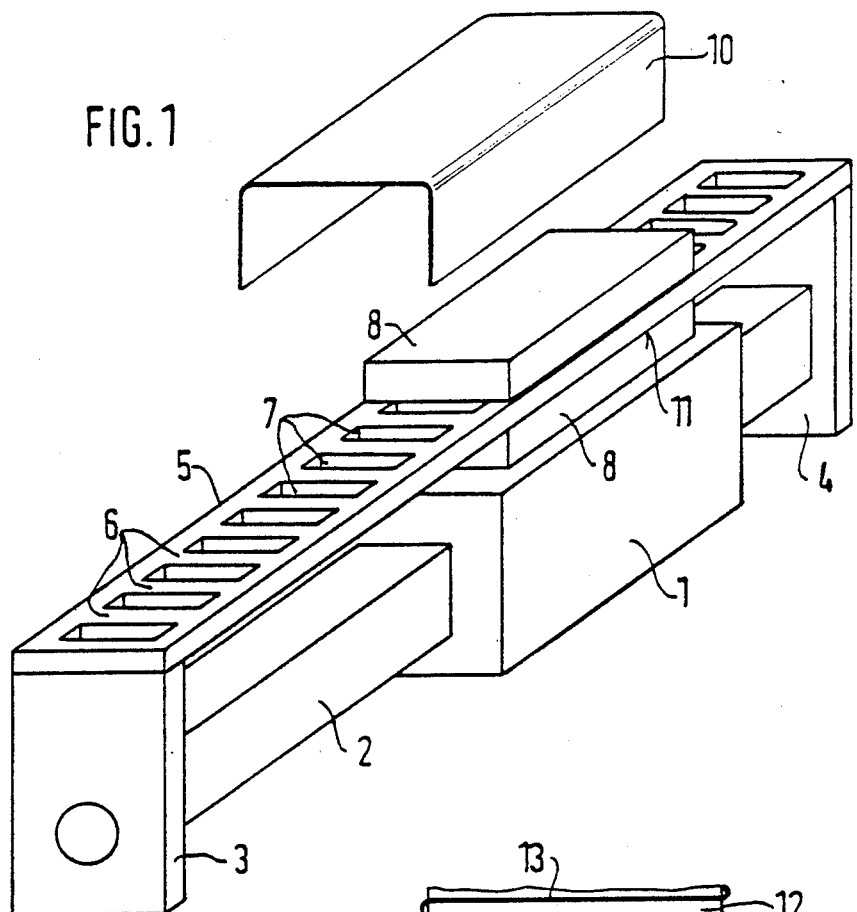
FIG. 1 shows a linear unit in a perspective view and
FIG. 2 shows an enlarged detail of the arrangement according to FIG. 1 in a side view.
Figure 2:
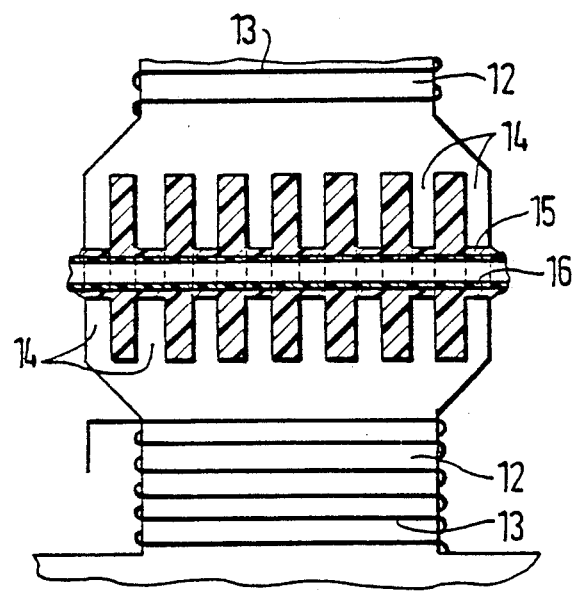

The linear unit includes a holder 1, which is designed as a tube and in which a carriage 2 is guided longitudinally displaceably. The tube 1 has a quadrilateral, preferably rectangular cross-section and is made as an extruded body, preferably of aluminium or an aluminium alloy. The carriage 2, guided displaceably in the tube 1, consists of a profile body of approximately square cross-section. The two end faces of the carriage 2 are each provided with an upwardly directed plate 3 and 4, respectively. A flexible strip 5 of magnetic material is self-supportingly fixed at its two ends on the plates 3 and 4. This strip forms the moving element of a linear motor on which a moving magnetic field acts. The strip 5 has webs 6, which were created by punching out rectangular-shaped clearances or recesses 7 in the strip. The webs 6 run perpendicular to the direction of movement of the carriage 2 and are spaced equally apart. They form the tooth structure of the strip. The associated motor stators 8 are fixed on the upper side of the holder 1 and are covered by a removable shroud 10. The stators 8 lie one above the other and enclose a pole gap 11, in which the strip 5 is guided. The stators preferably consist of laminated magnetic sheets with webs 12 which are formed by recesses and each bear an exciter winding 13. On the surfaces facing the strip 5, the sheet stack is provided with teeth 14, which run parallel to the webs 6 of the strip 5, so that the magnetic cross-flux path through the gap 11 is closed.

The surfaces of the teeth 14 facing the strip 5 bear a liner 15 of non-magnetic material, preferably of a suitable plastic. The intermediate spaces between the teeth 14 are filled, it being possible to use the same material as filling compound as for the liner 15. In this way, continuous flat surfaces are created on the stators, on which surfaces the strip 5 is guided on both sides.

The surfaces of the strip 5 facing the teeth 14 are likewise provided with a liner 16 of plastics, in order to reduce the sliding friction between the parts 5 and 8. The liner may be applied either before or after the punching-out of the clearances 7. In the first case, the liner only covers the webs 6 and the border regions of the strip 5, while it is removed in the region of the clearance 7 during punching-out of the same. In the second case, the clearances are also filled with the lining material, and continuous sliding surfaces are produced on both sides of the strip 5.

Instead of a strip of magnetic material, a strip of plastic into which a magnetic tooth structure is introduced could also be used. This dispenses with the subsequent application of a special plastic liner on the strip.

Thermoplastics such as PA, POM, high-molecular PE and PTFE are suitable in particular as liner materials. In the production of the liners on the stators 8, the procedure may be adopted that the intermediate spaces between the teeth 14 are first filled with a casting resin and then a coating of one of the materials mentioned is applied to the casting resin surfaces and the tooth surfaces.

Alongside the tooth structure 6, 7 on one side of the strip there may be a toothing for an electromagnetic position indicator, which toothing is magnetically shielded with respect to the toothing 6, 7 by longitudinal slots. Such a measuring system is distinguished by high accuracy and parts-saving design. It will be understood that each of the elements described above, or two or more together, may also find a useful application in other types of linear units for imparting a linear movement to objects differing from the types described above.

While the invention has been illustrated and described as embodied in a linear unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. Linear unit comprising a carriage; a holder, said carriage being guided longitudinally displaceably in said holder; and an electromagnetically operated linear motor including two mutually opposite stators and a rotor connected to the carriage and arranged in a pole gap between said two mutually opposite stators, said rotor incuding a strip having a tooth structure consisting of magnetic metal, said stators having guide surfaces bounding said pole gap, said strip being flexible and fixed self-supportingly on the carriage only at two ends thereof and guided on both sides on said surfaces of the stators.

2. Linear unit according to claim 1, wherein the strip is provided with rectangular openings which define said tooth structure and are arranged on the entire length of the strip and extend perpendicular to a direction of movement of the strip when the strip is moved with said carriage, said guide surfaces of the stators being provided with a non-magnetic liner.

3. Linear unit according to claim 1, wherein the strip consists of a plastic which includes a tooth structure of magnetic material.

4. Linear unit according to claim 2, wherein said strip has guide surfaces which face said guide surfaces of said stators, said guide surfaces of said strip being provided with a non-magnetic liner.

5. Linear unit according to claim 2, wherein said liner is formed by plastics.

6. Linear unit according to claim 4, wherein said liner on said guide surfaces of said strip is formed of plastics.

* * * * *